US012780246B2

(12) United States Patent
Kinder et al.

(10) Patent No.: US 12,780,246 B2
(45) Date of Patent: Nov. 3, 2026

(54) SYSTEMS AND METHODS FOR TRAILER WHEELBASE MEASUREMENT FOR AUTONOMOUS VEHICLES

(71) Applicant: Torc Robotics, Inc., Blacksburg, VA (US)

(72) Inventors: Dennis Kinder, Ostfildern (DE); Stefan Heyer, Esslingen am Neckar (DE)

(73) Assignee: Torc Robotics, Inc., Blacksburg, VA (US)

(*) Notice: Subject to any disclaimer, the term of this patent is extended or adjusted under 35 U.S.C. 154(b) by 37 days.

(21) Appl. No.: 18/953,763

(22) Filed: Nov. 20, 2024

(65) Prior Publication Data

US 2026/0138637 A1 May 21, 2026

(51) Int. Cl.

| | |
|---|---|
| ***B60W 60/00*** | (2020.01) |
| ***G01S 13/28*** | (2006.01) |
| ***G01S 13/53*** | (2006.01) |
| ***G01S 13/931*** | (2020.01) |
| ***G01S 17/26*** | (2020.01) |
| ***G01S 17/58*** | (2006.01) |

(52) U.S. Cl.

CPC ......... *B60W 60/001* (2020.02); *G01S 13/282* (2013.01); *G01S 13/53* (2013.01); *G01S 17/26* (2020.01); *B60W 2300/14* (2013.01); *B60W 2420/408* (2024.01); *B60W 2530/201* (2020.02)

(58) Field of Classification Search

CPC ........... B60W 60/001; B60W 2300/14; B60W 2420/408; B60W 2530/201; G01S 13/282; G01S 13/53; G01S 17/26

See application file for complete search history.

(56) References Cited

U.S. PATENT DOCUMENTS

| | | | | |
|---|---|---|---|---|
| 5,717,390 | A | 2/1998 | Hasselbring | |
| 5,928,309 | A | 7/1999 | Korver et al. | |
| 8,798,906 | B2 | 8/2014 | Shibata | |
| 9,261,590 | B1 | 2/2016 | Brown | |
| 10,691,135 | B2 | 6/2020 | Campbell et al. | |
| 10,906,536 | B2 | 2/2021 | Smith et al. | |
| 11,415,999 | B2 | 8/2022 | Lee et al. | |
| 11,536,831 | B2 | 12/2022 | Lau | |
| 11,550,061 | B2 | 1/2023 | Smith et al. | |
| 2018/0061239 | A1* | 3/2018 | Prasad | G01S 13/867 |

(Continued)

*Primary Examiner* — Adam R Mott

*Assistant Examiner* — Heather J Keniry

(74) *Attorney, Agent, or Firm* — Armstrong Teasdale LLP

(57) ABSTRACT

An autonomous vehicle selectively couplable to a trailer includes at least one sensor configured to capture data of an environment in which the autonomous vehicle operates and an autonomy computing system operably coupled to the at least one sensor. The autonomy computing system includes at least one memory device in communication with at least one processor programmed to receive the sensor data from the at least one sensor as the autonomous vehicle is in motion, determine velocity of objects in proximity to the autonomous vehicle based on the sensor data, identify one or more rotating objects among the objects in proximity to the autonomous vehicle as wheels of the trailer coupled to the autonomous vehicle based on the velocity, determine a wheelbase of the autonomous vehicle coupled to the trailer based on the wheels, and control operation of the autonomous vehicle coupled to the trailer based on the wheelbase.

18 Claims, 11 Drawing Sheets

(56) References Cited

U.S. PATENT DOCUMENTS

| | | | | |
|---|---|---|---|---|
| 2019/0322317 | A1* | 10/2019 | Pourrezaei Khaligh | G01P 3/04 |
| 2021/0261159 | A1* | 8/2021 | Pazhayampallil | G01S 17/89 |
| 2022/0113415 | A1 | 4/2022 | Singer et al. | |
| 2022/0146676 | A1* | 5/2022 | Armstrong-Crews | G01S 7/4808 |
| 2023/0367320 | A1* | 11/2023 | Shenai | B62D 7/1509 |
| 2025/0276733 | A1* | 9/2025 | Abroshan | B62D 13/06 |

* cited by examiner

SYSTEMS AND METHODS FOR TRAILER WHEELBASE MEASUREMENT FOR AUTONOMOUS VEHICLES

TECHNICAL FIELD

The field of the disclosure relates generally to autonomous vehicles and, more specifically, to systems and methods for measuring a wheelbase of a trailer coupled to an autonomous vehicle.

BACKGROUND OF THE INVENTION

Commercial vehicles, such as those used in the trucking industry, haul heavy loads which are often carried in a detachable trailer. These loads may be carried in myriad types of trailers, having varying lengths and wheelbases. As can be appreciated, the length and wheelbase of the trailer impact the maneuverability of the semi-trailer, and therefore, the roadways and routes the semi-trailer can successfully traverse. For autonomous vehicles, with the absence of a driver, it is difficult to identify the type of trailer coupled to the autonomous vehicle and/or a wheelbase of the trailer coupled to the autonomous vehicle.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In accordance with an aspect of the disclosure, an autonomous vehicle selectively couplable to a trailer includes at least one sensor and an autonomy computing system operably coupled to the at least one sensor. The at least one sensor is configured to capture data of an environment in which an autonomous vehicle operates. The autonomy computing system includes at least one processor in communication with at least one memory device. The at least one processor is programmed to receive the sensor data from the at least one sensor as the autonomous vehicle is in motion, determine velocity of objects in proximity to the autonomous vehicle based on the sensor data, identify wheels of a trailer coupled to the autonomous vehicle by identifying one or more rotating objects among the objects in proximity to the autonomous vehicle as the wheels based on the velocity, determine a wheelbase of the autonomous vehicle coupled to the trailer based on the wheels, and control operation of the autonomous vehicle based on the wheelbase.

In accordance with another aspect of the disclosure, a computer implemented method of determining a wheelbase of an autonomous vehicle coupled to one or more trailers includes receiving sensor data of an environment in which an autonomous vehicle is operating as the autonomous vehicle is in motion, the sensor data detected from at least one sensor operably coupled to the autonomous vehicle, determining velocity of objects in proximity to the autonomous vehicle based on the sensor data, identifying wheels of a trailer coupled to the autonomous vehicle by identifying one or more rotating objects among the objects in proximity to the autonomous vehicle as the wheels based on the velocity, determining a wheelbase of the autonomous vehicle coupled to the trailer based on the wheels, and controlling operation of the autonomous vehicle based on the wheelbase.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
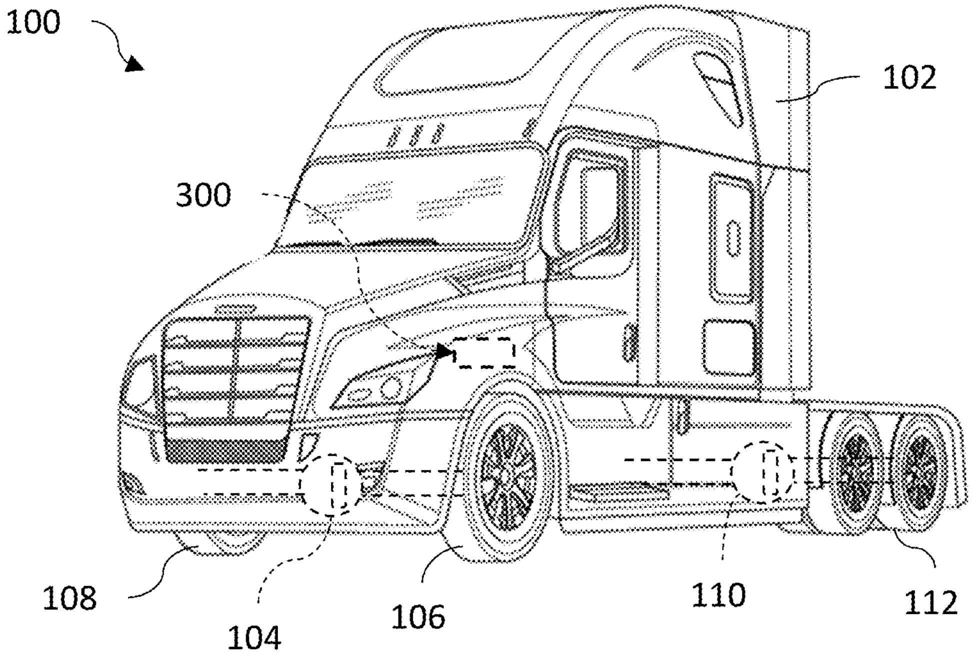
FIG. 1 is a perspective view of an autonomous vehicle in accordance with the disclosure.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

The disclosure is directed to systems and methods for determining a wheelbase of a trailer coupled to an autonomous vehicle. The autonomy computing system described herein determines a total wheelbase of a semi-trailer and/or a wheelbase of the trailer based on the identified positions of wheels of the trailer relative to one or more sensors operably coupled to the autonomous vehicle. The autonomy computing system is operably coupled to one or more of radio detection and ranging (radar) sensors, Light detection and ranging (LiDAR) sensors, cameras, etc. and/or combinations thereof. The radar sensors and the LiDAR sensors are frequency-modulated continuous-wave (FMCW) sensors that sense a velocity and position of objects in proximity to the autonomous vehicle as the autonomous vehicle is operating on a roadway. The autonomy computing system receives the sensor data and determines a velocity of objects in proximity to the autonomous vehicle. Wheels of the trailer coupled to the autonomous vehicle are identified by identifying one or more rotating objects among the objects in proximity to the autonomous vehicle as the wheels based on the velocity. The wheelbase of the autonomous vehicle is determined based on the identified wheels of the trailer, and control of the autonomous vehicle is based on the determined wheelbase. The wheels of the trailer coupled to the autonomous vehicle may be identified by applying a filter to the sensor data to identify a Doppler signature of the wheels.

Myriad types of trailers Autonomous vehicles are couplable to an autonomous vehicle or a tractor, and are typically not under the control of the manufacturer of the autonomous vehicle or the tractor. Without being able to modify or otherwise design the trailers to include sensors or other devices that communicate with the autonomous vehicle, the autonomous vehicle is generally unable to determine the type of trailer it is coupled to, its wheelbase, and other characteristics, such as an overall length, a height, a width, etc. of the trailer. The systems and methods described herein utilize sensors operably coupled to the autonomous vehicle to identify a wheelbase of a trailer coupled to the autonomous vehicle and/or other characteristics of the trailer. The type of trailer may be identified from a library of trailer types stored in one or more modules of the autonomy computing system corresponding to the determined wheelbase. With the wheelbase of the trailer determined, and/or the type of trailer coupled to the autonomous vehicle determined, the autonomous vehicle may be controlled as it is operating on a roadway taking into consideration a turning radius of the autonomous vehicle coupled to the trailer, a length of the trailer, a height of the trailer, a number of trailers coupled to the autonomous vehicle (e.g., a tandem trailer), when it is safe to merge onto a roadway, when it is safe to change lanes in traffic, avoid bridges or other overhead obstacles, avoid roadways, bridges, or other infrastructure having weight limits, etc.

The various sensors, including the radar sensors, the LiDAR sensors, and the one or more cameras, are preexisting on the autonomous vehicle, thereby eliminating the need to redesign or reconfigure the autonomous vehicle specifically for the purposes of detecting trailer wheelbase, and reducing costs from the redesign while increasing the operational capacity of the autonomous vehicle. The detection of the wheelbase is accomplished by processing sensor data from these sensors.

Turning now to the drawings, FIG. 1 illustrates an autonomous vehicle 100 including a cabin 102 that may be supported, and steered in, the required direction by a front or first axle 104 having front wheels 106 and 108, and a second or rear axle 110 having rear wheels 112 that are partially shown in FIG. 1. The cabin 102 may be an uncrewed cabin or a crewed cabin. in some embodiments, the rear wheels 112 of the autonomous vehicle 100 may be operably coupled to any number of axles without departing from the scope of the disclosure. In one non-limiting embodiment, the rear wheels 112 are operably coupled to two axles, where the rear axle 110 is defined generally as a midpoint between each of the two axles. The front wheels 106, 108 are positioned by a steering system that includes a steering wheel and a steering column (not shown). The steering wheel and the steering column may be located in the interior of the cabin 102. It is envisioned that the autonomous vehicle 100 may be an autonomous vehicle that may be operated by an autonomy computing system 200 (see FIG. 3, described later) based on data collected by a sensor network including one or more sensors. As can be appreciated, the steering wheel and the steering column, and all or parts of the cabin 102, may be omitted in an autonomous vehicle.

Figure 2:
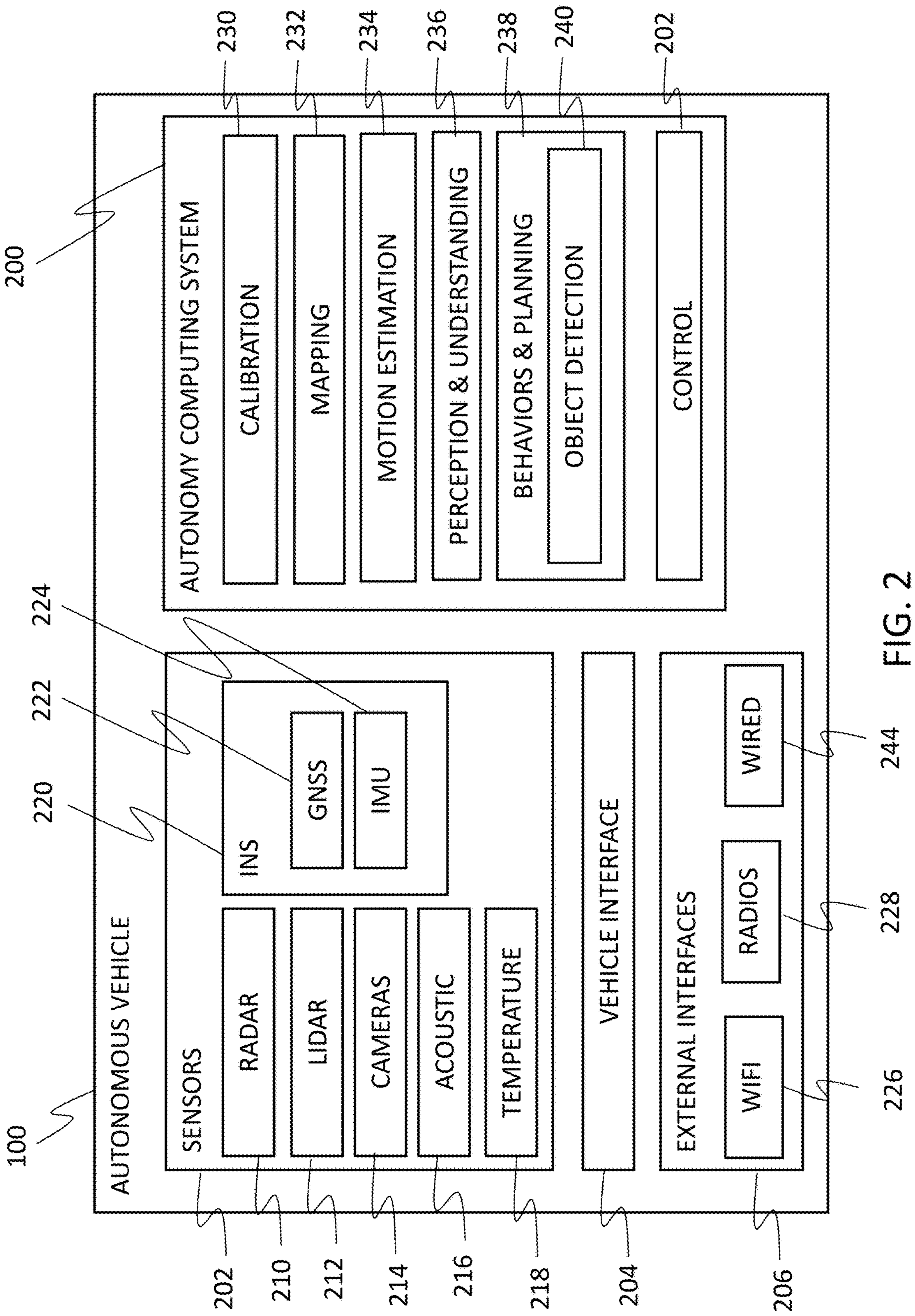
FIG. 2 is a block diagram of an autonomous vehicle system in accordance with the disclosure.

With reference to FIG. 2, a block diagram of the autonomous vehicle 100 is illustrated. In the example embodiments, the autonomous vehicle 100 includes the autonomy computing system 200, sensors 202, a vehicle interface 204, and external interfaces 206. In the example embodiment, the sensors 202 may include various sensors such as, for example, radar sensors 210, LiDAR sensors 212, cameras 214, acoustic sensors 216, temperature sensors 218, or an inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. The sensors 202 generate respective output signals based on detected physical conditions of the autonomous vehicle 100 and its proximity. As described in further detail below, these signals may be used by the autonomy computing system 200 to determine how to control operation of the autonomous vehicle 100.

The cameras 214 are configured to capture images of the environment surrounding the autonomous vehicle 100 in any aspect or field of view (FOV). The FOV may have any angle or aspect such that images of the areas in front of, to the side of, behind, above, or below the autonomous vehicle 100 may be captured. In some embodiments, the FOV may be limited to particular areas around the autonomous vehicle 100 (e.g., forward of the autonomous vehicle 100, to the sides of the autonomous vehicle 100, etc.) or may surround 360 degrees of the autonomous vehicle 100. In some embodiments, the autonomous vehicle 100 includes multiple cameras 214, and the images from each of the multiple cameras 214 may be stitched or combined to generate a visual representation of the multiple cameras'FOVs, which may be used to, for example, generate a bird's eye view of the environment surrounding the autonomous vehicle 100. In some embodiments, the image data generated by the cameras 214 may be sent to the autonomy computing system 200 or other aspects of the autonomous vehicle 100, and this image data may include the autonomous vehicle 100 or a generated representation of the autonomous vehicle 100. In some embodiments, one or more systems or components of the autonomy computing system 200 may overlay labels to the features depicted in the image data, such as on a raster layer or other semantic layer of a high-definition (HD) map.

The LiDAR sensors 212 generally include a laser generator and a detector that send and receive a LiDAR signal such that LiDAR point clouds (or "LiDAR images") of the areas ahead of, to the side of, behind, above, or below the autonomous vehicle 100 may be captured and represented in the LiDAR point clouds. In some embodiments, the autonomous vehicle 100 may include multiple LiDAR and/or radar systems and point cloud data from the multiple systems may be stitched together. In some embodiments, the system inputs from the one or more cameras 214, the radar sensors 210, and/or the LiDAR sensors 212 may be fused. The radar sensors 210 and/or the LiDAR sensors 212 may be operably coupled to one or more actuators to modify a position and/or orientation of the radar sensors 210 and/or the LiDAR sensors 212 or components thereof. The radar sensors 210 may include short-range radar (SRR), mid-range radar (MRR), long-range radar (LRR), or ground-penetrating radar (GPR). In the exemplary embodiment, one or more LiDAR sensors 212 and/or radar sensors 210 are frequency-modulated continuous wave (FMCW) sensors. One or more sensors may emit radio waves, and a processor may process received reflected data (e.g., raw radar sensor data) from the emitted radio waves. In some embodiments, the system inputs from the cameras 214, the radar sensors 210, or the LiDAR sensors 212 may be fused or used in combination to determine conditions (e.g., locations of other objects) around the autonomous vehicle 100.

The radar sensors 210 and/or the LiDAR sensors 212 may be configured to use ultraviolet (UV), visible, or infrared (IR) light to image objects and may be used to map physical features of an object with high resolution (e.g., using a narrow laser beam). In some examples, the radar sensors 210 and/or the LiDAR sensors 212 may generate a point cloud and the point cloud may be rendered to visualize the environment surrounding the autonomous vehicle 100 (or object(s) therein). In some embodiments, the point cloud may be rendered as one or more polygon(s) or mesh model (s) through, for example, surface reconstruction. In one non-limiting embodiments, autonomy computing system 200 may identify one or more rotating objects within the data received from the radar sensors 210 and/or the LiDAR sensors 212. For example, using FMCW radar sensors 210 or FMCW LiDAR sensors 212, the autonomy computing system 200 may identify a Doppler signature or varying Doppler shift associated with wheels of the autonomous vehicle 100 and wheel of a trailer coupled to the autonomous vehicle 100. The autonomy computing system 200 may use a time-frequency diagram of a Doppler signal received from the radar sensors 210 and/or the LiDAR sensors 212 to identify a radius of the wheels and/or an angular velocity of the wheels. Using FMCW radar sensors 210 and/or FMCW LiDAR sensors 212, a distance between the radar sensors 210 and/or the LiDAR sensors 212 may be determined, enabling a wheelbase of the autonomous vehicle 100 coupled to a trailer to be determined.

With continued reference to FIG. 2, the GNSS receiver 222 is positioned on the autonomous vehicle 100 and may be configured to determine a location of the autonomous vehicle 100, which may be embodied as GNSS data, as described herein. The GNSS receiver 222 may be configured to receive one or more signals from a global navigation satellite system (e.g., Global Positioning System (GPS) constellation) to localize the autonomous vehicle 100 via geolocation. In some embodiments, the GNSS receiver 222 may provide an input to or be configured to interact with, update, or otherwise utilize one or more digital maps, such as an HD map (e.g., in a raster layer or other semantic map). In some embodiments, the GNSS receiver 222 may provide direct velocity measurement via inspection of the Doppler effect on the signal carrier wave. It is envisioned that multiple GNSS receivers 222 may also provide direct measurements of the orientation of the autonomous vehicle 100. For example, with two GNSS receivers 222, two attitude angles (e.g., roll and yaw) may be measured or determined. In some embodiments, the autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about the autonomous vehicle 100 and its environment.

The IMU 224 is a micro-electrical-mechanical (MEMS) device that measures and reports one or more features regarding the motion of the autonomous vehicle 100, although other implementations are contemplated, such as mechanical, fiber-optic gyro (FOG), or FOG-on-chip (SiFOG) devices. The IMU 224 may measure an acceleration, an angular rate, and/or an orientation of the autonomous vehicle 100 or one or more of its individual components using a combination of accelerometers, gyroscopes, or magnetometers. The IMU 224 may detect linear acceleration using one or more accelerometers and rotational rate using one or more gyroscopes and attitude information from one or more magnetometers. In some embodiments, the IMU 224 may be communicatively coupled to one or more other systems, for example, the GNSS receiver 222 and may provide input to and receive output from the GNSS receiver 222 such that the autonomy computing system 200 is able to determine the motive characteristics (e.g., acceleration, speed/direction, orientation/attitude, etc.) of the autonomous vehicle 100.

In the example embodiment, the autonomy computing system 200 employs the vehicle interface 204 to send commands to the various aspects of the autonomous vehicle 100 that control the motion of the autonomous vehicle 100 (e.g., engine, throttle, steering wheel, brakes, etc.) and to receive input data from one or more of the sensors 202 (e.g., internal sensors). The external interfaces 206 are configured to enable the autonomous vehicle 100 to communicate with an external network via, for example, a wired connection 244 (e.g., Ethernet, USB, Serial, etc.) or wireless connection, such as Wi-Fi 226 or other radios 228. In embodiments including a wireless connection, the connection may be a wireless communication signal (e.g., Wi-Fi, cellular, LTE, 5 g, Bluetooth, etc.).

With continued reference to FIG. 2, in some embodiments, the external interfaces 206 may be configured to communicate with an external network via the wired connection 244, such as, for example, during testing of the autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by the autonomous vehicle 100 to navigate or otherwise operate, either autonomously or semi-autonomously. The digital files, executable programs, and other computer readable code may be stored locally or remotely and may be routinely updated (e.g., automatically or manually) via the external interfaces 206 or updated on demand. In some embodiments, the autonomous vehicle 100 may deploy with all of the data it needs to complete a mission (e.g., perception, localization, and mission planning) and may not utilize a wireless connection or other connection while underway.

In the example embodiment, the autonomy computing system 200 is implemented by one or more processors and memory devices of the autonomous vehicle 100. Autonomy computing system 200 includes modules, which may be hardware components (e.g., processors or other circuits) or software components (e.g., computer applications or processes executable by the autonomy computing system 200), configured to generate outputs, such as control signals, based on inputs received from, for example, the sensors 202. These modules may include, for example, a calibration module 230, a mapping module 232, a motion estimation module 234, a perception and understanding module 236, a behaviors and planning module 238, and a control module or controller 242. The object detection module 240, for example, may be embodied within another module, such as the behaviors and planning module 238, or separately. These modules may be implemented in dedicated hardware such as, for example, an application specific integrated circuit (ASIC), a field programmable gate array (FPGA), or a microprocessor, or implemented as executable software modules, or firmware, written to memory and executed on one or more processors onboard the autonomous vehicle 100. As described herein, the object detection module 240 interprets data received from the various sensors 202 and identifies one or more objects on or in proximity to the roadway, features of the roadway, and/or one or more objects and/or characteristics of a trailer coupled to the autonomous vehicle 100.

Autonomy computing system 200 of the autonomous vehicle 100 may be completely autonomous (fully autonomous), semi-autonomous, or with any level of autonomy. In one example, autonomy computing system 200 can operate under Level 5 autonomy (e.g., full driving automation), Level 4 autonomy (e.g., high driving automation), Level 3 autonomy (e.g., conditional driving automation), Level 2 autonomy (e.g., partial driving automation), or Level 1 autonomy (e.g., driver assistance). As used herein the term "autonomous" includes fully autonomous, semi-autonomous, or having any level of autonomy.

Figure 3:
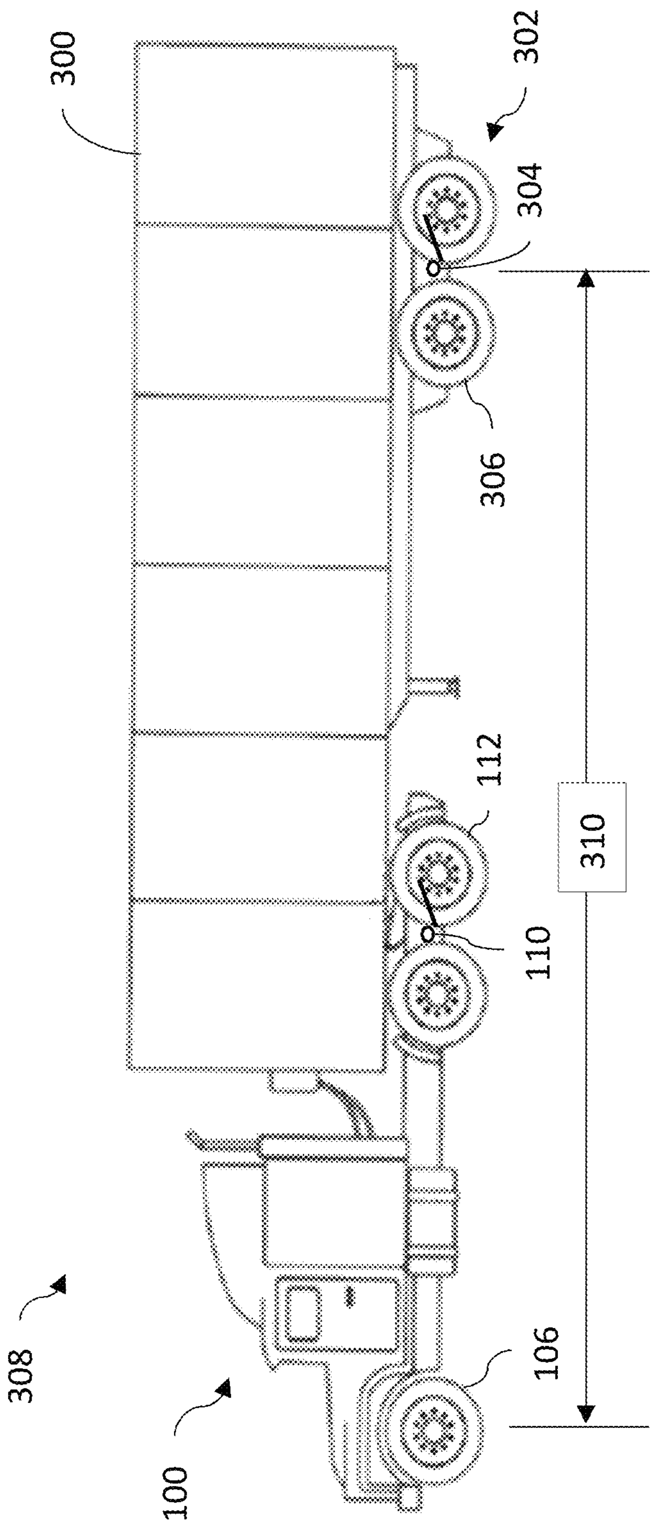
FIG. 3 is an elevation view of the autonomous vehicle of FIG. 1 coupled to a trailer.

Turning to FIG. 3, a trailer 300 is illustrated coupled to the autonomous vehicle 100 and includes a trailer wheel assembly 302 defining a trailer axle 304. In some embodiments, the trailer wheel assembly 302 of the trailer 300 may include any suitable number of wheels 306 operably coupled to any suitable number of axles without departing from the scope of the disclosure. In one non-limiting embodiment, the trailer wheel assembly 302 includes two axles, where a trailer axle 304 is defined at a generally midpoint position between the two axles. In embodiments, the trailer wheel assembly 302 may be adjustable to alter a mass distribution of the trailer 300. The trailer 300 may be any type of trailer suitable for use with the autonomous vehicle 100 and is configured to carry or otherwise support a load or cargo (not shown), such as, for example, a dry van trailer, a flatbed trailer, a refrigerated trailer, a drop-deck trailer, amongst others. As can be appreciated, when coupled to the autonomous vehicle 100, the trailer 300 and the autonomous vehicle 100 form a semi-trailer or rig 308.

Figure 4:
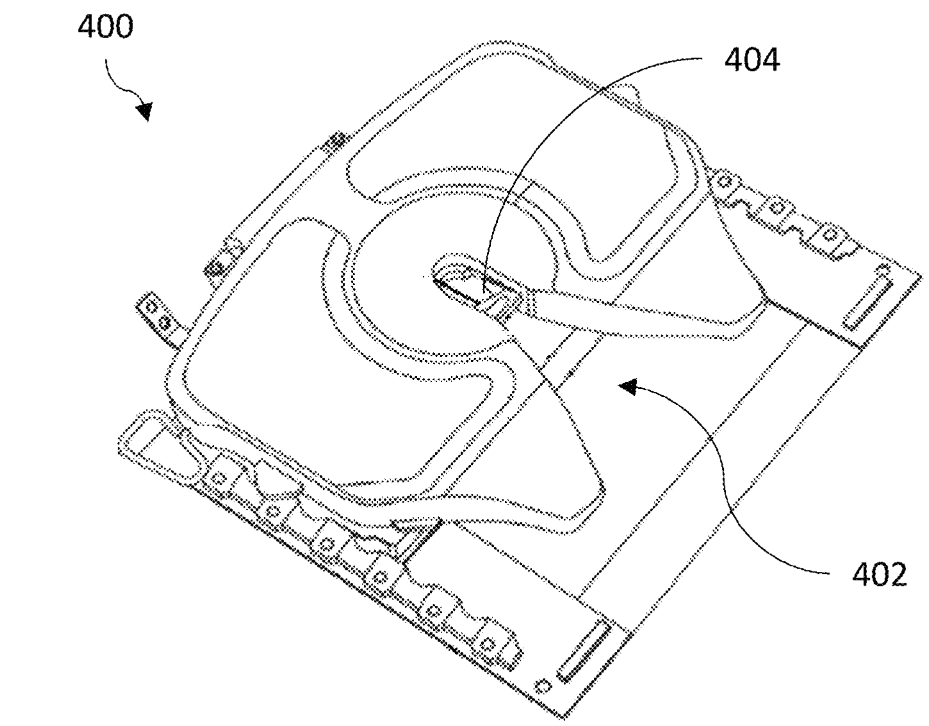
FIG. 4 is a perspective view of a fifth-wheel hitch of the autonomous vehicle of FIG. 1.
Figure 5:
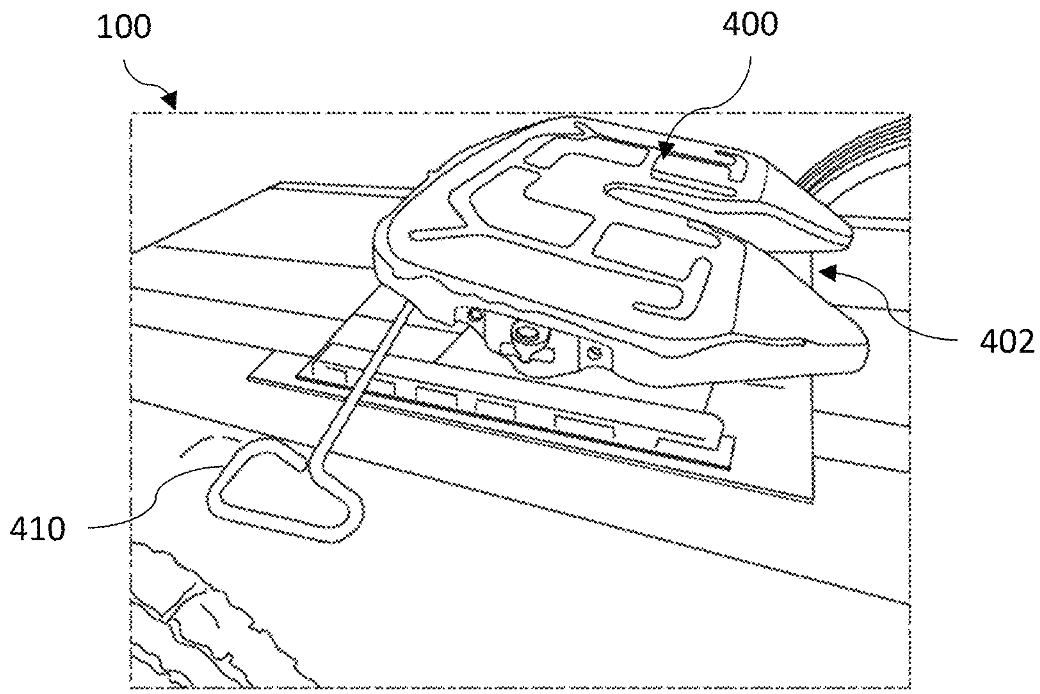
FIG. 5 is a perspective view of the fifth-wheel hitch of FIG. 4, illustrating the fifth-wheel hitch coupled to the autonomous vehicle of FIG. 1.

With additional reference to FIGS. 4 and 5, the autonomous vehicle 100 includes a fifth-wheel hitch 400 that is longitudinally adjustable along a centerline of the autonomous vehicle 100 to selectively alter a wheelbase (See FIG. 3) of the semi-trailer 308, and thereby the weight-on-axle loading of the semi-trailer 308. The fifth-wheel hitch 400 is operably coupled to the autonomous vehicle 100 at a position that is generally above the rear axle 110 (e.g., in a direction extending from a surface supporting the autonomous vehicle 100). The fifth-wheel hitch 400 defines a throat 402 having a pair of locking jaws 404 configured to selectively receive and engage a coupling unit or trailer kingpin (not shown) of the trailer 300 and selectively couple the trailer 300 to the autonomous vehicle 100. In some embodiments, the pair of locking jaws 404 may be manually operated or automatically operated via the autonomy computing system 200. It is envisioned that the longitudinal position of the fifth-wheel hitch 400 may be selectively locked and unlocked manually, via a handle, lever, or other suitable device 410, or automatically by the autonomy computing system 200 via an air release (not shown), electrically operated switch (not shown), etc. or combinations thereof. The autonomy computing system 200 may instruct or otherwise autonomously control operation of the autonomous vehicle 100 to drive the autonomous vehicle 100 forward or backward until the fifth-wheel hitch 400 is in a desired position or in embodiments, may control the longitudinal position of the fifth-wheel hitch 400 pneumatically, mechanically, electromechanically, etc. The autonomy computing system 200 monitors or otherwise determines the longitudinal position of the fifth-wheel hitch 400, or in embodiments, the trailer kingpin, via one or more sensors of the sensors 202.

Figure 6:
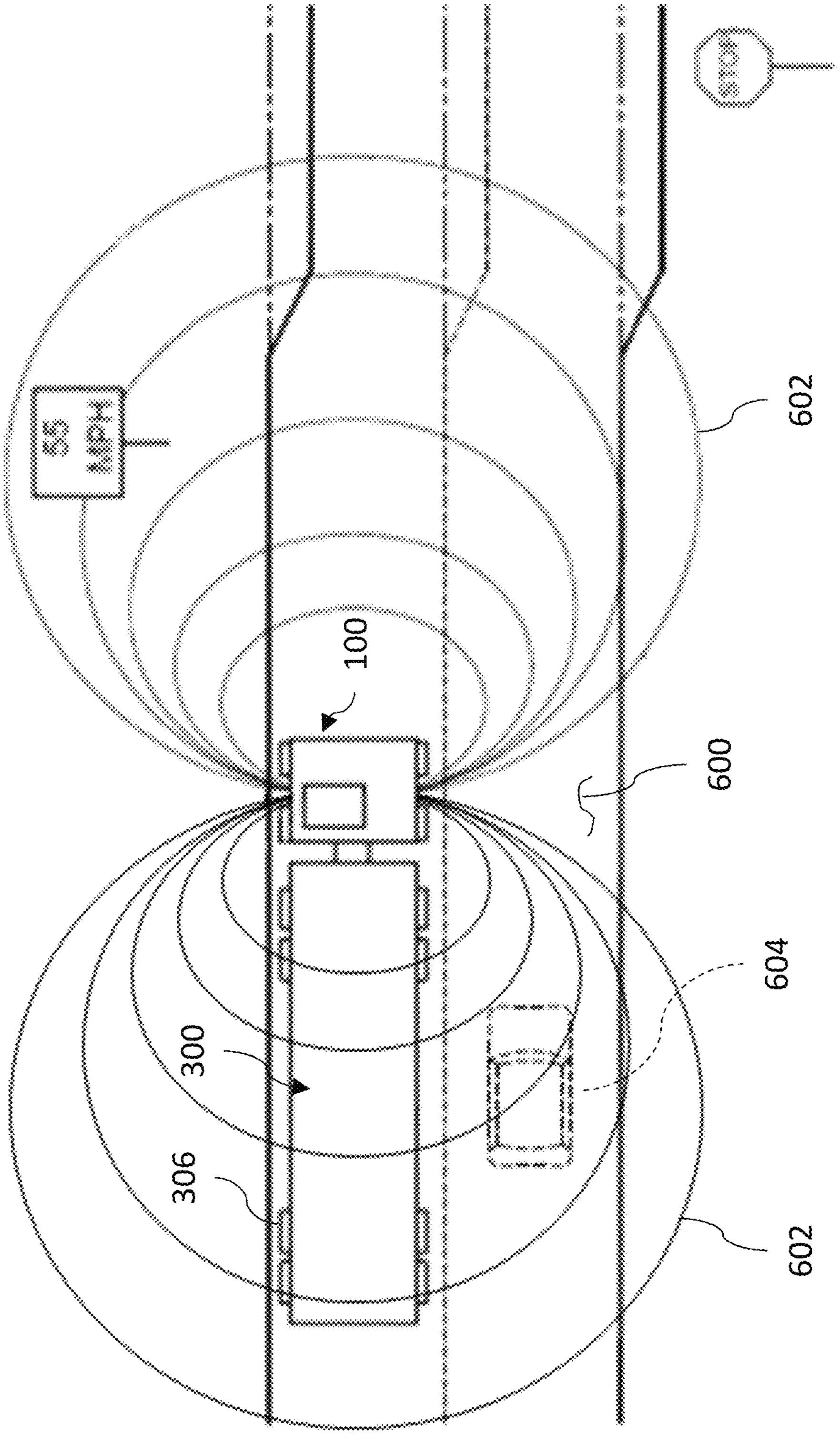
FIG. 6 is a plan view of the autonomous vehicle of FIG. 1 coupled to a trailer, illustrating the autonomous vehicle and trailer operating on a roadway.

FIG. 6 is an illustration of the autonomous vehicle 100 shown in FIG. 1 operating on a roadway 600. The autonomous vehicle 100 is illustrated operating on the roadway 600, pulling the trailer 300 and moving among various other vehicles or objects 604 on the roadway 600. The autonomy computing system 200 receives data from a field of view 602, which may be a forward field of view, a rear field of view, one or more side field of views, a 360 field of view, and/or combinations thereof) of the various sensors 202, such as the radar sensors 210, the LiDAR sensors 212, the one or more cameras 214, etc. (collectively "perception data") to sense an environment surrounding the autonomous vehicle 100. In this manner, as the autonomous vehicle 100 travels along the roadway 600, the autonomy computing system 200 continuously receives perception data from the various sensors 202 and identifies and/or classifies objects or groups of objects in the environment. In some embodiments, the autonomy computing system 200 may receive perception data from the various sensors 202 periodically and/or continuously. The autonomy computing system 200 interprets the perception data received from the various sensors 202 to identify one or more objects 604, such as, for example, pedestrians, vehicles, debris, etc., and features of the roadway (e.g., lane lines, bends, etc.) around the autonomous vehicle 100.

The various sensors 202, including the radar sensors 210, the LiDAR sensors 212, and the one or more cameras 214, are pre-existing on the autonomous vehicle 100, thereby eliminating the need of redesign or reconfiguration of the autonomous vehicle 100 specifically for the purposes of detecting trailer wheelbase, and reducing costs from the redesign while increasing the operational capacity of the autonomous vehicle 100. The detection of wheelbase is accomplished by processing sensor data from these sensors.

Figure 7:
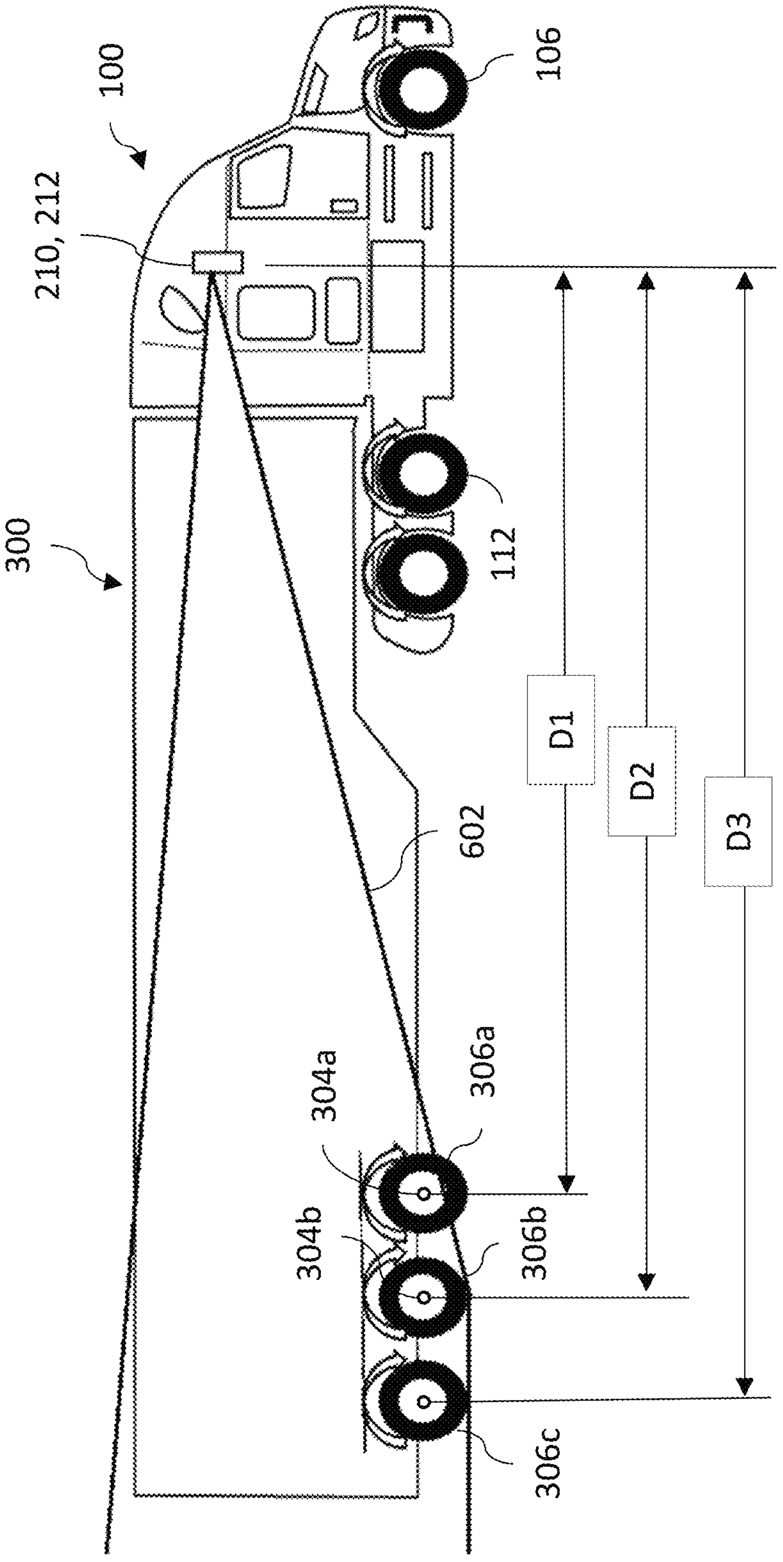
FIG. 7 is an elevation view of the autonomous vehicle of FIG. 1 coupled to a trailer, illustrating a field of view of sensors of the autonomous vehicle system of FIG. 2.
Figure 8:
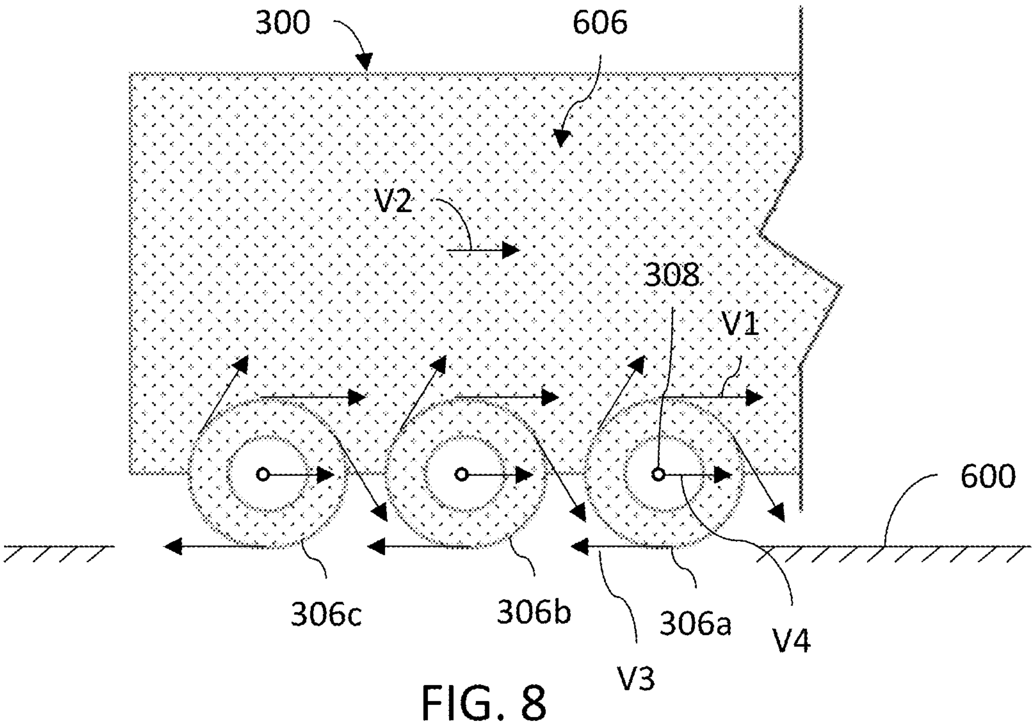
FIG. 8 is a schematic view of a point cloud generated by the autonomous vehicle system of FIG. 2.
Figure 9:
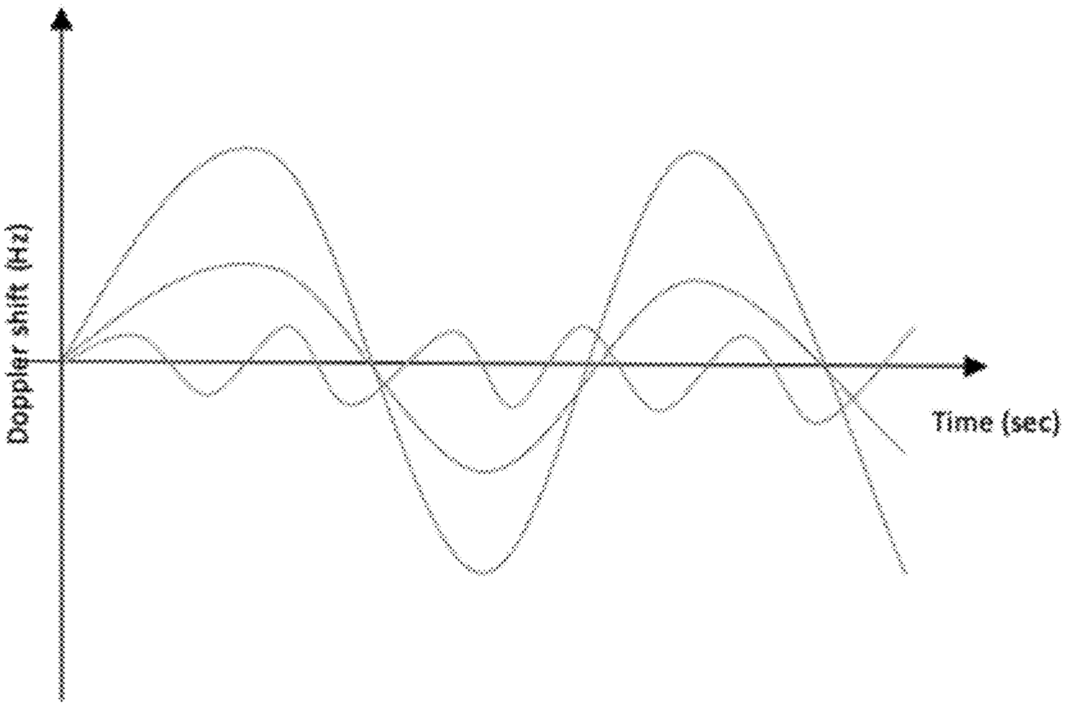
FIG. 9 is a graphical representation of a time-frequency diagram, illustrating a Doppler shift of objects identified within the point cloud of FIG. 8.

With additional reference to FIGS. 7-9, in the exemplary embodiment, the autonomy computing system 200 receives FMCW data from one or both of the radar sensors 210 and/or the LiDAR sensors 212 as the autonomous vehicle is in motion (e.g., travelling along the roadway 600). The field of view 602 of the radar sensors 210 and/or the LiDAR sensors 212 encompasses the trailer 300 coupled to the autonomous vehicle 100 and the wheels 306 of the trailer 300. The autonomy computing system 200 generates a point cloud 606 of the environment around the autonomous vehicle 100 using the FMCW data received from the radar sensors 210 and/or the LiDAR sensors 212. Using FMCW, the point cloud 606 includes information relating to a velocity of points of the point cloud 606 and a position of the points of the point cloud 606 relative to the radar sensors 210 and/or the LiDAR sensors 212. For example, points of the point cloud corresponding to a portion of the trailer 300 include a velocity that is equal to or substantially equal to the velocity of the autonomous vehicle 100 travelling along the roadway 600. In this manner, the points of the point cloud corresponding to a portion of the trailer 300 have a relative velocity (e.g., relative to the velocity of the autonomous vehicle) that is zero or substantially zero. In contrast, objects 604 on the roadway 600, such as a vehicle, pedestrians, signs, etc. will typically have a relative velocity different from zero when the autonomous vehicle 100 is in motion.

In the example embodiment, the autonomy computing system 200 generates and/or otherwise interprets a time-frequency diagram (FIG. 9) of a Doppler signal received from the radar sensors 210 and/or the LiDAR sensors 212 to identify a Doppler shift produced by objects 604 in proximity to the autonomous vehicle 100 and/or the trailer 300. Rotating objects, such as wheels 106, 112 of the autonomous vehicle 100, the wheels 306 of the trailer 300, and/or wheels (not shown) of vehicles on the roadway 600, produce a varying Doppler shift due to the varying velocities or translational speed of the points of the point cloud 606 corresponding to the rotating object. For example, points of point cloud 606 located at a top (e.g., spaced apart from the roadway 600) of the wheels 306 of the trailer 300 are moving towards the radar sensors 210 and/or the LiDAR sensors 212 whereas points of point cloud 606 located at the bottom of the wheels (e.g., adjacent to or contacting the roadway 600) are moving away from the radar sensors 210 and/or the LiDAR sensors 212. In this manner, points of the point cloud 606 moving towards the radar sensors 210 and/or the LiDAR sensors 212 have a velocity V1 that is greater than a velocity V2 of the autonomous vehicle 100 and trailer 300 travelling along the roadway 600. Points of the point cloud 606 moving away from the radar sensors 210 and/or the LiDAR sensors 212 have a velocity V3 that is less than the velocity V2 of the autonomous vehicle 100 and trailer 300. The velocity of the points of the point cloud 606 corresponding to the wheels 306 of the trailer 300 varies as the wheels 306 rotate, producing a varying Doppler shift. The varying Doppler shift, or Doppler signature, of the rotating objects may be associated with the wheels 306 of the trailer 300. In this manner, a filter may be applied to the data received from the radar sensors 210 and/or the LiDAR sensors 212 to identify the Doppler signature and correlate the identified Doppler signature to the wheels 306 of the trailer 300. In some embodiments, the autonomy computing system 200 may identify a shape of the rotating objects using the Doppler signature and correlate the shape of the rotating objects to the wheels 306. In other embodiments, the rotating objects are identified in velocity point clouds as rotating point clouds.

The autonomy computing system 200 interprets the Doppler signature of the wheels 306 of the trailer 300 and identifies a center of rotation 308 of each wheel 306 of the trailer 300. The center of rotation 308 of each wheel 306 of the trailer 300 includes a velocity V4 that is equal to or substantially equal to the velocity V2 of the autonomous vehicle 100 and the trailer 300. In some embodiments, the center of rotation 308 is identified as the center of the rotating point cloud in velocity point clouds. Using the FMCW radar sensors 210 and/or FMCW LiDAR sensors 212 enables the autonomy computing system 200 to determine a distance D between each wheel 306 of the trailer 300 and the radar sensors 210 and/or the LiDAR sensors 212. In some embodiments, the trailer 300 may include more than one axle, and therefore, more than one row of wheels 306. In the exemplary embodiment, the trailer 300 includes three axles with three rows of wheels **306*a*, 306*b*, and 306*c*. The autonomy computing system 200 identifies distances D1, D2, and D3 between each of the wheels 306*a*, 306*b*, 306*c* and the radar sensors 210 and/or the LiDAR sensors 212**.

In some embodiments, the autonomy computing system 200 distinguishes the wheels 306 of the trailer 300 from other rotating objects detected within the FMCW data from one or both of the radar sensors 210 and/or the LiDAR sensors 212 that are proximate the autonomous vehicle 100 and trailer 300 (e.g., identifies false positives). For example, one or more vehicles may be travelling in an adjacent lane to the autonomous vehicle 100 at or near the velocity of the autonomous vehicle. The autonomy computing system 200 may compare a lateral position (e.g., transverse distance) of the detected rotating objects to trailer widths and/or lane widths stored in a library. Rotating objects located at a position that is greater than a maximum trailer width of the trailers stored in the library may be identified as a false positive and/or eliminated as candidates for wheels 306 of the trailer 300 and/or determined to be wheels or other rotating objects associated with objects on the roadway other than the autonomous vehicle 100 and the trailer 300. In some embodiments, the autonomous computing system 200 may utilize one or more sensors 202 disposed on opposing sides of the autonomous vehicle 100 to correlate rotating objects detected in FMCW data associated with a first side of the autonomous vehicle 100 and the trailer 300 with rotating objects detected in FMCW data associated with a second, opposite side of the autonomous vehicle 100 and the trailer 300. Rotating objects that are not unassociated with rotating objects on both sides of the autonomous vehicle 100 and the trailer 300 may be excluded as candidates for the wheels 306 of the trailer 300 or classified as being associated with objects on the roadway other than the autonomous vehicle 100 and the trailer 300. In embodiments, the autonomy computing system 200 may identify rows of rotating objects (e.g., two or more axles of the trailer 300) in proximity to one another and correlate rotating objects in each row as the wheels 306 of the trailer 300. Rotating objects identified in the FMCW data that are not disposed or otherwise oriented in a row with other rotating objects may be excluded as candidates for the wheels 306 of the trailer 300 and/or classified as being associated with objects on the roadway other than the autonomous vehicle 100 and the trailer 300.

The autonomy computing system 200 uses a known location and/or position of the radar sensors 210 and/or the LiDAR sensors 212 relative to the front wheels 106 of the autonomous vehicle 100 to determine a wheelbase of the autonomous vehicle 100 coupled to the trailer 300. The autonomy computing system 200 uses the determined wheelbase of the autonomous vehicle 100 coupled to the trailer 300, and in some embodiments, other characteristics of the trailer 300 coupled to the autonomous vehicle 100, to operate the autonomous vehicle on the roadway 600. For example, the determined wheelbase may be used to determine a minimum turning radius of the autonomous vehicle 100 coupled to the trailer 300, when it is safe to merge onto the roadway 600, when it is safe to change lanes in traffic, etc.

In some embodiments, the autonomy computing system 200 may store a library of types of trailers 300 and characteristics associated with each trailer 300 stored in the library. In this manner, the autonomy computing system 200 may compare the position of the wheels 306 of the trailer 300, a determined wheelbase 310 of the trailer 300, and/or other detected features of the trailer 300, to the wheelbases and/or other detected features of the trailers stored in the library of types of trailers 300 and identify a type of trailer 300 corresponding to the position of the wheels 306, the determined wheelbase 310, and/or the other detected features of the trailer 300. Identifying the type of trailer 300 coupled to the autonomous vehicle 100 provides additional information to the autonomy computing system 200 regarding the trailer 300, such as for example, a height of the trailer 300, a width of the trailer 300, an overall length of the trailer 300, a position of the wheels 306 relative to a rear of the trailer 300, etc., and combinations thereof. The autonomy computing system 200 uses the determined wheelbase 310 of the autonomous vehicle 100 coupled to the trailer 300, and a position of the fifth-wheel hitch 400 on the autonomous vehicle 100, to determine a center of rotation of the trailer 300 relative to the autonomous vehicle 100 and/or a center or rotation of the autonomous vehicle 100 coupled to the trailer 300. From the center of rotation of the trailer 300 and/or the autonomous vehicle 100 coupled to the trailer 300, a turning radius of the autonomous vehicle 100 coupled to the trailer 300 and a position of each of the wheels 306 and/or axles 304*a*, 304*b*, etc. relative to the center of rotations may be determined. In some embodiments, the autonomy computing system 200 may use the turning radius of the autonomous vehicle 100 coupled to the trailer 300, the length of the trailer 300, a height of the trailer 300, a number of trailers 300 coupled to the autonomous vehicle 100 (e.g., a tandem trailer), when it is safe to merge onto the roadway 600, when it is safe to change lanes in traffic, avoid bridges or other overhead obstacles, avoid roadways, bridges, or other infrastructure having weight limits, etc.

In some embodiments, the autonomy computing system 200 may identify the wheelbase 310 of the trailer 300 using only one sensor modality. For example, the autonomy computing system 200 may use the radar sensors 210 to identify the wheelbase 310 of the trailer 300. In some embodiments, the autonomy computing system 200 may use the LiDAR sensors 212 to identify the wheelbase 310 of the trailer 300. In one non-limiting embodiment, the autonomy computing system 200 may confirm the wheelbase 310 of the trailer 300 determined by a first modality (e.g., one of the radar sensors 210 or the LiDAR sensors 212) using the second modality (e.g., the other one of the radar sensors 210 or the LiDAR sensors 212). In embodiments, the autonomy computing system 200 may incorporate or otherwise utilize data received from the one or more cameras 214 when identifying or otherwise determining a wheelbase 310 of the trailer 300 or to confirm the determined wheelbase 310.

Figure 10:
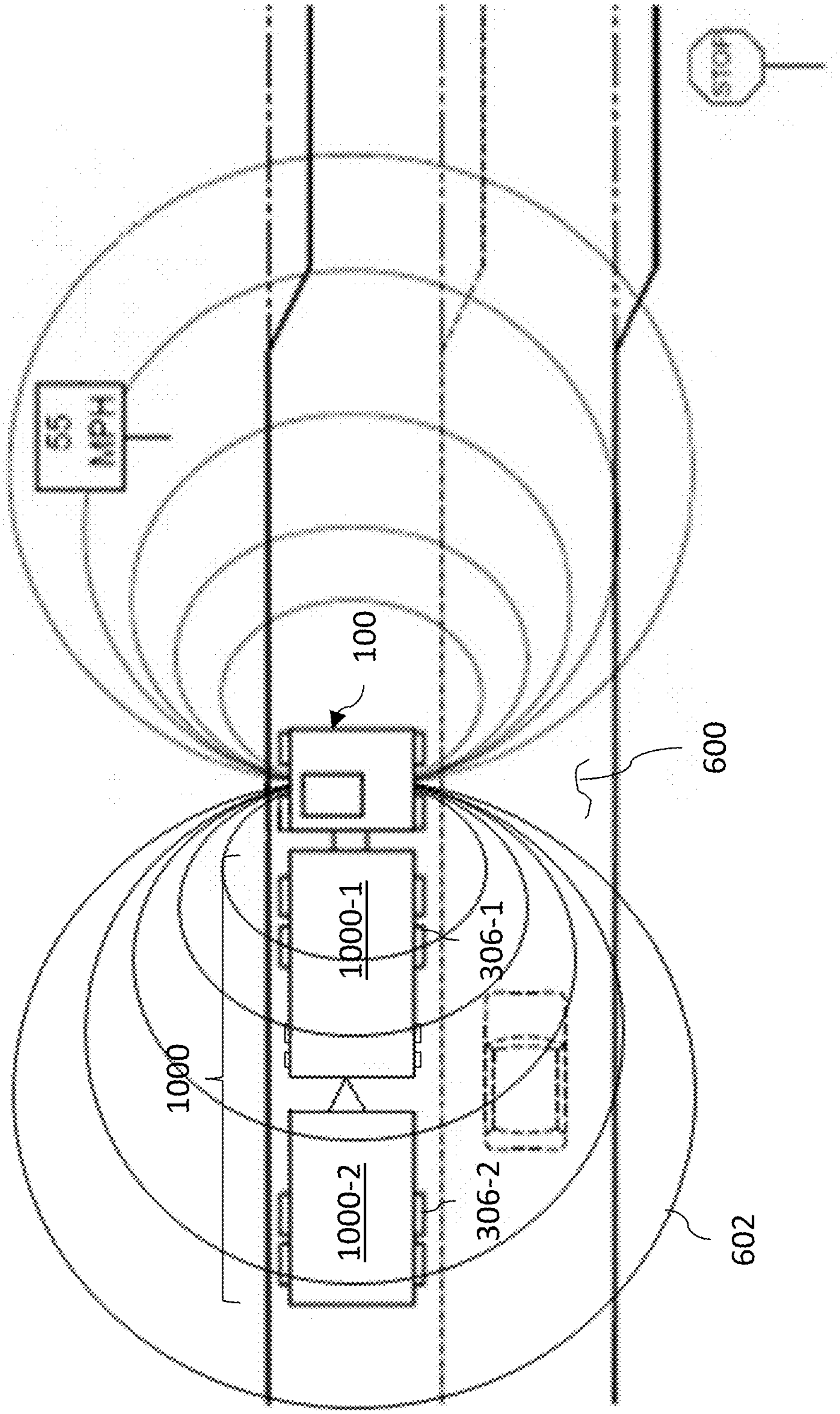
FIG. 10 is a plan view of the autonomous vehicle of FIG. 1 coupled to a tandem trailer, illustrating the autonomous vehicle and tandem trailer operating on a roadway.

With additional reference to FIG. 10, the autonomy computing system 200 may identify a tandem trailer 1000 coupled to autonomous vehicle 100. The autonomy computing system 200 identifies a first trailer 1000-1 of the tandem trailer 1000 and a second trailer 1000-2 of the tandem trailer 1000 based on the identified wheels 306-1 of the first trailer 1000-1, the identified wheels 306-2 of the second trailer 1000-2, and one or more features and/or characteristics of the tandem trailer 1000. The autonomy computing system 200 may determine a varying distance and/or wheelbase of the tandem trailer 1000 as the autonomous vehicle 100 navigates the roadway 600. For example, as the autonomous vehicle 100 navigates a bend, the second trailer 1000-2 of the tandem trailer 1000 may follow a different radius or turning circle than a radius or turning circle of the first trailer 1000-1 of the tandem trailer 1000. In this manner, the wheels 306-2 of the second trailer 1000-2 will follow a different path than expected due to the second trailer 1000-2 rotating about a different point than the first trailer 1000-1. Using the determined position of the wheels 306-1 and 306-2 of the first trailer 1000-1 and the second trailer 1000-2 as the autonomous vehicle 100 is navigating the roadway 600, the autonomy computing system 200 determines or otherwise identifies a position where the second trailer 1000-2 is coupled to the first trailer 1000-1.

In addition to identifying a wheelbase 310 of the autonomous vehicle 100 coupled to the trailer 300, the autonomy computing system 200 may compare the collected perception data with stored data. For example, the autonomy computing system 200 may identify and classify various features detected in the collected perception data from the environment with features stored in a digital map. In the exemplary embodiment, the autonomy computing system 200 may detect lane lines and may compare the detected lane lines with lane lines stored in the digital map. Additionally, the autonomy computing system 200 may detect road signs and landmarks to compare such features with features in a digital map. The features may be stored as points (e.g., signs, small landmarks, etc.) and may have various properties (e.g., style, visible range, refresh rate, etc.) that, when taken into consideration with the identified wheelbase 310 and other characteristics of the trailer 300, may control how the autonomous vehicle 100 interacts with the various features. Based on the comparison of the detected features with the features stored in the digital map(s), the autonomy computing system 200 may generate a confidence level, which may represent a confidence of the vehicle in its location with respect to the features on a digital map and hence, its actual location.

The autonomy computing system 200 receives perception data that can be compared to one or more stored digital maps, object libraries, etc. to determine where the autonomous vehicle 100 is in the world, where the autonomous vehicle 100 is on the digital map(s), etc. In particular, the autonomy computing system 200 receives perception data from the perception and understanding module 236 and/or the various sensors 202 sensing the environments surrounding the autonomous vehicle 100 and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the autonomous vehicle 100 and/or may be stored and/or accessed remotely. In at least one embodiment, the autonomous vehicle 100 deploys with sufficiently stored information in one or more digital map files and/or object libraries to complete a mission without connection to an external network during the mission. A centralized mapping system may be accessible via the network.

The image classification function may determine the features of an image (e.g., a visual image from the one or more cameras 214) and/or a point cloud from the LiDAR sensors 212 and/or the radar sensors 210). The image classification function may be any combination of software and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the one or more cameras 214, the LiDAR sensors 212, and/or the radar sensors 210. In some embodiments, the image classification function may be configured to classify features based on information received from only a portion of the multiple available sources. For example, in the case that the captured visual camera data includes images that may be blurred, the autonomy computing system 200 may identify objects based on data from one or more of the other sensors (e.g., the radar sensors 210 and/or the LiDAR sensors 212) that does not include the image data.

The computer vision function is configured to process and analyze images captured by the various sensors 202 or stored on one or more modules of the autonomy computing system 200, to identify objects and/or features in the environment surrounding the autonomous vehicle 100. The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.).

In an exemplary embodiment, the object detection module 240 executes an object detection procedure to detect unknown objects. For example, the object detection module 240 can communicate with the radar sensors 210, the LiDAR sensors 212, and/or the one or more cameras 214 to obtain an image (e.g., image data) of an environment surrounding the autonomous vehicle 100. The object detection module 240 identifies a mask for the image. The mask may include multiple categories (e.g., road surface, potential unknown objects, wheels, the rest of the image, etc.). Based on the mask, the object detection module 240 can generate (e.g., extract) a 2D bounding box for the unknown objects. The object detection module 240 communicates with the radar sensors 210 and/or the LiDAR sensors 212. The object detection module 240 compares the set of data points to the masked image to generate a subset of the data points. The subset may include the data points that belong to the road surface or that are within the 2D bounding box. The object detection module 240 may further refine the subset of data points into foreground and background data points. Based on the determination of the foreground data points, the object detection module 240 generates a 3D bounding box and detects one or more unknown objects in the environment of the autonomous vehicle 100.

Figure 11A:
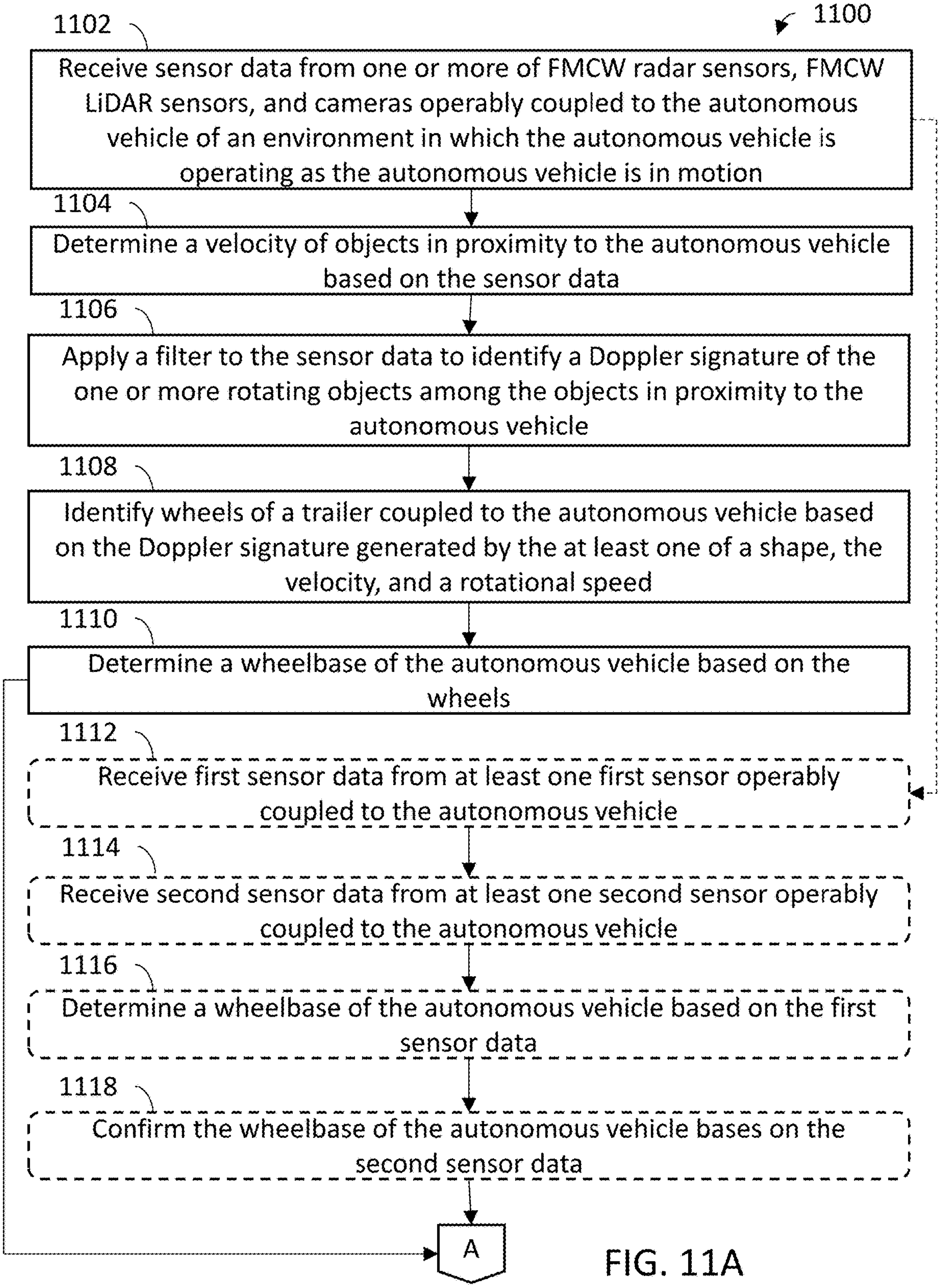
FIG. 11A is a flow diagram of a method of determining a wheelbase of an autonomous vehicle coupled to one or more trailers in accordance with the disclosure.
Figure 11B:
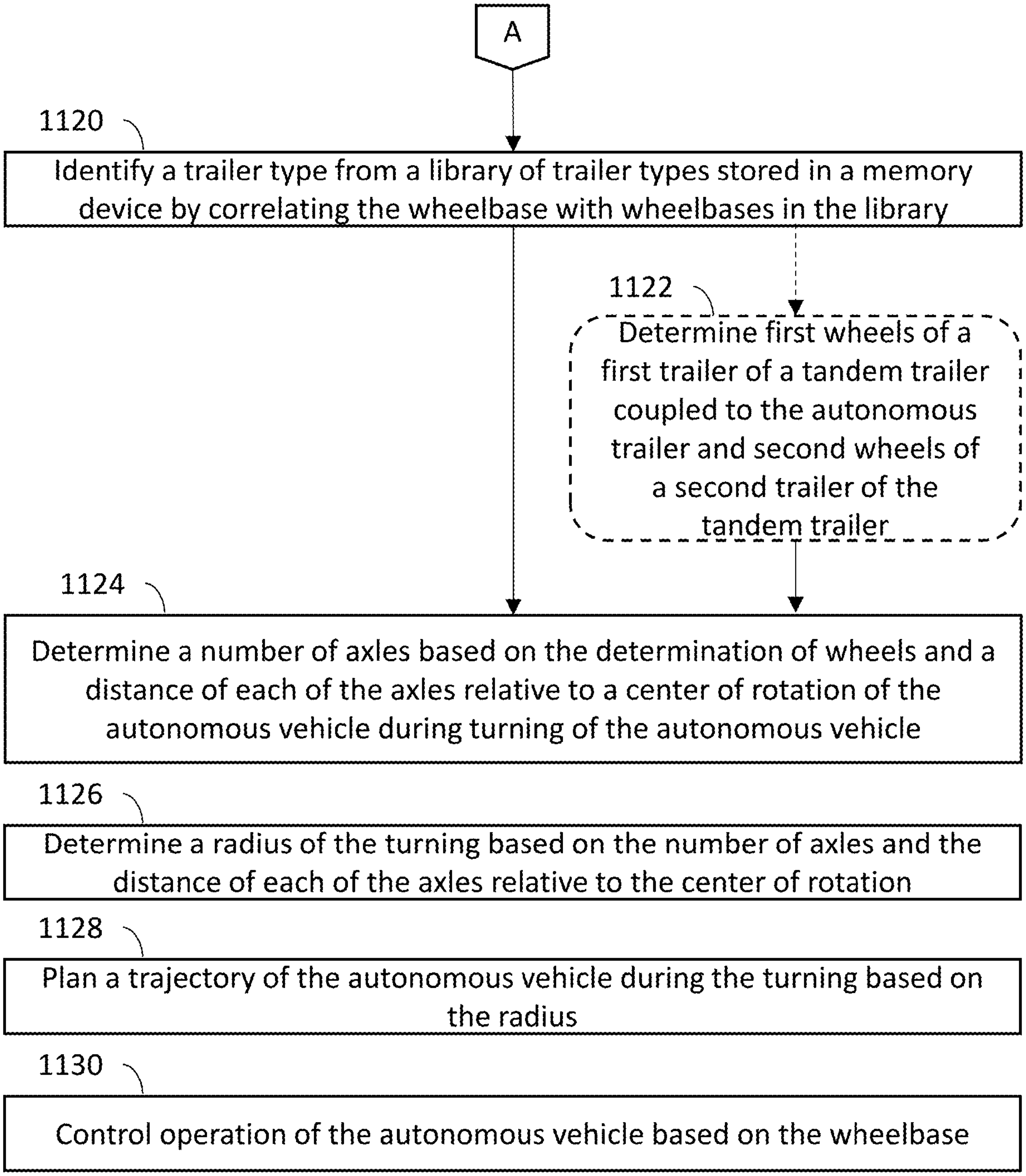
FIG. 11B is a continuation of the flow diagram of FIG. 11A.

With reference to FIGS. 11A and 11B, a method of determining a wheelbase of an autonomous vehicle coupled to one or more trailers is illustrated and generally identified by reference numeral 1100. The autonomy computing system receives 1102 sensor data from one or more of FMCW radar sensors, FMCW LiDAR sensors, and cameras operably coupled to the autonomous vehicle of an environment in which the autonomous vehicle is operating as the autonomous vehicle is in motion. The autonomy computing system determines 1604 a velocity of objects in proximity to the autonomous vehicle based on the sensor data. In some embodiments, the autonomy computing system applies 1606 a filter to the sensor data to identify a Doppler signature of the one or more rotating objects among the objects in proximity to the autonomous vehicle. The autonomy computing system identifies 1608 wheels of a trailer coupled to the autonomous vehicle based on at least one of a shape, the velocity, and a rotational speed in the sensor data. The autonomy computing system determines 1610 a wheelbase of the autonomous vehicle coupled to the trailer based on the wheels. Optionally, the autonomy computing system receives 1612 first sensor data from at least one first sensor and receives 1614 second sensor data from at least one second sensor. The autonomy computing system determines 1616 the wheelbase based on the first sensor data and confirms 1618 the wheelbase based on the second sensor data. The autonomy computing system identifies 1620 a trailer type from a library of trailer types stored in a memory device by correlating the wheelbase with wheelbases in the library. Optionally, the autonomy computing system determines 1622 first wheels of a first trailer of a tandem trailer coupled to the autonomous vehicle and second wheels of a second trailer of the tandem trailer. The autonomy computing system determines 1624 a number of axles based on the determination of wheels and a distance of each of the axles relative to a center of rotation of the autonomous vehicle during turning of the autonomous vehicle. The autonomy computing system determines 1626 a radius of the turning based on the number of axles and the distance of each of the axles relative to the center of rotation. The autonomy computing system plans 1628 a trajectory of the autonomous vehicle during the turning based on the radius. In some embodiments, the wheelbase, the center of rotation of the autonomous vehicle, and other characteristics of the trailer enables the autonomy computing system to determine when it is safe to merge onto a roadway, change lanes in traffic, avoid bridges or other overhead obstacles, avoid roadways, bridges, or other infrastructure having weight limits, etc. The autonomy computing system controls 1630 operation of the autonomous vehicle based on the wheelbase. The above-described method may be performed in any order and any number of times without departing from the scope of the disclosure.

Figure 12:
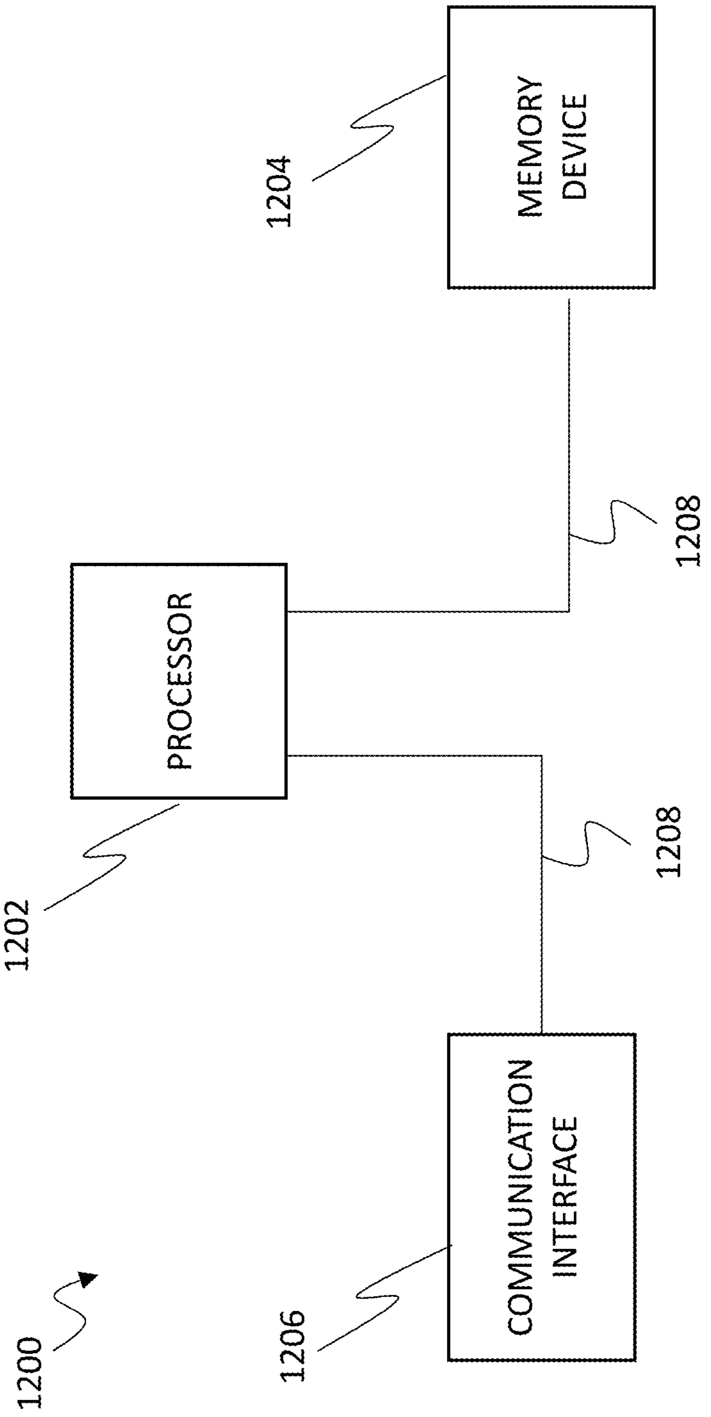
FIG. 12 is a block diagram of an example computing device for implementation of embodiments of the disclosure.

Turning to FIG. 12, a block diagram of an embodiment of a computing device for implementation of embodiments of the disclosure is illustrated and generally identified by reference numeral 1200. Methods described herein may be implemented with one or more computing devices 1200. Autonomy system 200 may be implemented with one or more computing device 1200. The computing device 1200 includes a processor 1202 and a memory device 1204. The processor 1202 is coupled to the memory device 1204 via a system bus 1208. The term “processor” refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are examples only, and thus are not intended to limit in any way the definition or meaning of the term "processor."

The processor 1202 may be operatively coupled to a communication interface 1206 such that the computing device 1200 is capable of communicating with another device, such as for example, a remote application server, user equipment, a mobile device, a smart vehicle, a mission control or a central hub, another processing system, for example, using wireless communication or data transmission over one or more radio links or digital communication channels using one or more of a Wi-Fi protocol, an RFID protocol, or a Near-Field Communication (NFC) protocol, as one-way communication or two-way communication, or combinations thereof.

In the example embodiment, the memory device 1204 includes one or more devices that enable information, such as executable instructions or other data (e.g., sensor data), to be stored and retrieved. Moreover, the memory device 1204 includes one or more computer readable media, such as, without limitation, dynamic random-access memory (DRAM), static random-access memory (SRAM), a solid-state disk, or a hard disk. In the example embodiment, the memory device 1204 stores, without limitation, application source code, application object code, configuration data, additional input events, application states, assertion statements, validation results, or any other type of data. The computing device 1200 in the example embodiment, may also include a communications interface 1206 that is coupled to the processor 1202 via the system bus 1208. Moreover, the communication interface 1706 is communicatively coupled to data acquisition devices.

In the example embodiment, the processor 1202 may be programmed by encoding an operation using one or more executable instructions and providing the executable instructions in the memory device 1204. In the example embodiment, the processor 1202 is programmed to select a plurality of measurements that are received from data acquisition devices.

In operation, a computer executed computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified, and in embodiments of the disclosure may include additional or fewer operations than those disclosed herein. For example, it is contemplated that executing or performing a particular operation before, contemporaneously with, or after another operation is within the scope of aspects of the disclosure.

In embodiments, the memory device 1204 may be external to the computing device 1200 and may be accessed by using a storage interface or the system bus 1208. For example, the memory device 1204 may include a storage area network (SAN), a network attached storage (NAS) system, or multiple storage units such as, for example, hard disks and solid-state disks in a redundant array of inexpensive disks (RAID) configuration.

In some embodiments, the processor 1202 may be operatively coupled to the memory device 1204 via the system bus 1208. It is envisioned that the system bus 1208 may be any component capable of providing the processor 1202 with access to the memory device 1204. In embodiments, the system bus 1208 may include, for example, an Advanced Technology Attachment (ATA) adapter, a Serial ATA (SATA) adapter, a Small Computer System Interface (SCSI) adapter, a RAID controller, a SAN adapter, a network adapter, or any component providing the processor 1202 with access to the memory device 1204.

An example technical effect of the methods, systems, and apparatus described herein includes at least one of: (a) identifying a type of trailer coupled to the autonomous vehicle using sensors coupled to the autonomous vehicle, (b) identifying a wheelbase of the trailer coupled to the autonomous vehicle using sensors coupled to the autonomous vehicle, (c) identifying a number of trailers coupled to the autonomous vehicle (e.g., a tandem trailer), (d) identifying a turning radius of the autonomous vehicle coupled to the trailer, and (e) modifying or otherwise controlling the autonomous vehicle as it operates on a roadway based on the determined type of trailer and/or wheelbase of the trailer.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, module, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination or instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via nay suitable means including memory sharing, message passing, token passing, network transmission, etc.

The actual software code or specialized control hardware used to implement these systems and methods is not limited of the claimed features or this disclosure. Thus, the operations and behavior of the systems and methods were described without reference to the specific software code being understood that software and control hardware may be designed to implement the systems and methods based on the description herein.

When implemented in software, the disclosure functions may be embodied, or stored, as one or more instructions or code on or in memory. In the embodiments described herein, memory includes non-statutory computer-readable media, which may include, but is not limited to, media such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomous vehicle selectively couplable to a trailer, comprising:
- at least one sensor configured to capture sensor data of an environment in which an autonomous vehicle operates, wherein the at least one sensor comprises:
  - at least one first sensor of a first modality configured to capture first sensor data; and
  - at least one second sensor of a second modality configured to capture second sensor data; and
- an autonomy computing system operably coupled to the at least one sensor, the autonomy computing system comprising at least one processor in communication with at least one memory device, the at least one processor programmed to:
  - receive the sensor data from the at least one sensor as the autonomous vehicle is in motion;
  - determine velocity of objects in proximity to the autonomous vehicle based on the sensor data;
  - identify wheels of a trailer coupled to the autonomous vehicle by:
    - identifying one or more rotating objects among the objects in proximity to the autonomous vehicle as the wheels based on the velocity;
  - determine a wheelbase of the autonomous vehicle coupled to the trailer based on the wheels; and
  - control operation of the autonomous vehicle based on the wheelbase
  - wherein the at least one processor is further programmed to:
    - determine the wheelbase based on first sensor data; and
    - confirm the wheelbase based on the second sensor data.

2. The autonomous vehicle according to claim 1, wherein the at least one processor is further programmed to:
- identify the one or more rotating objects as the wheels based on at least one of a shape, a rotational speed, or a translational speed of the one or more rotating objects.

3. The autonomous vehicle according to claim 1, wherein the at least one sensor comprises a frequency-modulated continuous wave (FMCW) light detection and ranging (LiDAR) sensor.

4. The autonomous vehicle according to claim 1, wherein the at least one sensor comprises a FMCW radio detection and ranging (radar) sensor.

5. The autonomous vehicle according to claim 1, wherein the at least one sensor comprises an FMCW sensor, wherein the at least one processor is further programmed to identify a Doppler signature of the one or more rotating objects based on the sensor data.

6. The autonomous vehicle according to claim 5, wherein the at least one processor is further programmed to apply a filter to the sensor data received from the FMCW sensor to identify the Doppler signature of the one or more rotating objects.

7. The autonomous vehicle according to claim 1, wherein the at least one processor is further programmed to:
- identify a trailer type from a library of trailer types stored in the memory device by:
  - correlating the wheelbase with wheelbases in the library.

8. The autonomous vehicle according to claim 1, wherein the at least one processor is further programmed to:

determine a number of axles based on determination of wheels and a distance of each of the axles relative to a center of rotation of the autonomous vehicle during turning of the autonomous vehicle;

determine a radius of the turning based on the number of axles and the distance of each of the axles relative to the center of rotation; and plan a trajectory of the autonomous vehicle during the turning based on the radius.

9. An autonomous vehicle selectively couplable to a trailer, comprising:

at least one sensor configured to capture sensor data of an environment in which an autonomous vehicle operates; and an autonomy computing system operably coupled to the at least one sensor, the autonomy computing system comprising at least one processor in communication with at least one memory device, the at least one processor programmed to:

receive the sensor data from the at least one sensor as the autonomous vehicle is in motion;

determine velocity of objects in proximity to the autonomous vehicle based on the sensor data;

identify wheels of a trailer coupled to the autonomous vehicle by:

identifying one or more rotating objects among the objects in proximity to the autonomous vehicle as the wheels, based on the velocity;

determine a wheelbase of the autonomous vehicle coupled to the trailer based on the wheels; and control operation of the autonomous vehicle based on the wheelbase, wherein the at least one processor is further programmed to determine first wheels of a first trailer of a tandem trailer coupled to the autonomous vehicle and second wheels of a second trailer of the tandem trailer.

10. A computer-implemented method of determining a wheelbase of an autonomous vehicle coupled to one or more trailers, the method comprising:

receiving sensor data of an environment in which an autonomous vehicle is operating as the autonomous vehicle is in motion, the sensor data detected from at least one sensor operably coupled to the autonomous vehicle;

determining velocity of objects in proximity to the autonomous vehicle based on the sensor data;

identifying wheels of a trailer coupled to the autonomous vehicle by:

identifying one or more rotating objects among the objects in proximity to the autonomous vehicle as the wheels based on the velocity;

determining a wheelbase of the autonomous vehicle coupled to the trailer based on the wheels; and controlling operation of the autonomous vehicle based on the wheelbase, wherein the method further comprises determining first wheels of a first trailer of a tandem trailer coupled to the autonomous vehicle and second wheels of a second trailer of the tandem trailer.

11. The method according to claim 10, wherein receiving the sensor data includes receiving sensor data from a frequency-modulated continuous wave (FMCW) light detection and ranging (LiDAR) sensor.

12. The method according to claim 10, wherein identifying the wheels further comprises eliminating false positives of identified wheels of the trailer.

13. The method according to claim 10, wherein receiving the sensor data includes receiving first sensor data from at least one first sensor and receiving second sensor data from at least one second sensor, wherein the method further includes:

determining the wheelbase based on the first sensor data; and confirming the wheelbase based on the second sensor data.

14. The method according to claim 10, wherein identifying the one or more rotating objects includes identifying the one or more rotating objects as the wheels based on at least one of a shape, a rotational speed, or a translational speed of the one or more rotating objects.

15. The method according to claim 10, wherein receiving the sensor data includes receiving the sensor data from a FMCW sensor, wherein identifying the one or more rotating objects includes identifying a Doppler signature of the one or more rotating objects based on the sensor data.

16. The method according to claim 15, further comprising:

applying a filter to the sensor data received from the FMCW sensor to identify the Doppler signature of the one or more rotating objects.

17. The method according to claim 10, further comprising:

identifying a trailer type from a library of trailer types stored in a memory device by correlating the wheelbase with wheelbases in the library.

18. The method according to claim 10, further comprising:

determining a number of axles based on determination of wheels and a distance of each of the axles relative to a center of rotation of the autonomous vehicle during turning of the autonomous vehicle;

determining a radius of the turning based on the number of axles and the distance of each of the axles relative to the center of rotation; and planning a trajectory of the autonomous vehicle during the turning based on the radius.

* * * * *